Patented June 24, 1930

1,766,718

UNITED STATES PATENT OFFICE

ALWIN MITTASCH, OF MANNHEIM, AND WALTER FRANKENBURGER, OF LUDWIGS-HAFEN-ON-THE-RHINE, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

MANUFACTURE OF VALUABLE ORGANIC COMPOUNDS

No Drawing. Application filed January 6, 1927, Serial No. 159,498, and in Germany January 15, 1926.

We have found that methane and its homologues or gases containing same can be advantageously converted into valuable organic compounds, in particular unsaturated hydrocarbons such as ethylene, acetylene and others, by bringing these gases at temperatures between about 700° and 1000° C. into contact with lustrous, graphite-like carbon deposits produced by the pyrogenic decomposition of carbon-containing compounds in the gas or vapor phase by contact with fireproof materials which are not too finely divided (that means, the fire-proof materials should not be employed in form of a more or less fine powder, but of lumps; thus for example, lumps of clay are very suitable, and other materials will be hereinafter specified).

The methane and its homologues subjected to the said treatment may be diluted with other gases, for example with hydrogen which latter, when employed in suitable quantities may assist in hindering a troublesome separation of soot. In order to prevent a separation of soot as much as possible the gas to be treated is passed at a rather high speed through the highly heated catalyst. This is also advantageous for the reason that thereby, especially when the gases are subsequently cooled very rapidly, a conversion of the unsaturated compounds formed into products of higher molecular weight, in particular aromatic compounds is avoided. On the other hand, in case the formation of the latter products is desired, a lower current speed of the gas and also a higher temperature and a longer layer of the catalyst may be employed. In some cases it may be advantageous to pass the resulting gas rich in ethylene or acetylene over other catalysts which possess a condensing action; in such second catalytic treatment another temperature, in most cases a lower one than in the first catalytic treatment, may be advantageously employed.

The process according to the present invention may be carried out under ordinary pressure as well as under elevated or reduced pressure.

The catalysts to be employed may be prepared by the thermal decomposition for example of methane, acetylene, ethylene or other hydrocarbons or their derivatives. As pointed out above, the fire-proof material should not be too finely divided. Very valuable fire-proof materials are such as consist of or contain silica. For example quartz, china clay, ordinary clay and the like may be employed. Also metalloid compounds resistant to heat such as carbides, silicides, nitrides or phosphides may be successfully employed. Any other kind of fire-proof material, however, is also suitable as a carrier of the carbon in accordance with the present invention. The said catalysts, the characteristic constituent of which is the deposited graphite-like carbon, may be employed in mixture with carbon in the form of carbides, for example with iron carbide.

The following examples will further illustrate how our present invention may be carried out in practice, but the invention is not limited to these examples.

Example 1

A porcelain tube having an internal diameter of 20 millimetres is filled with a layer 20 centimetres in length of lumps of clay of about 3 millimeters edge-length. Said filled part of the tube is heated to about 700° C. by means of an electric furnace. A mixture of 3 parts, by volume, of acetylene and 1 part, by volume, of hydrogen is then passed through the pipe with a speed of about 40 litres per hour. After the gas has been passed through the tube for about half an hour or even less, the pipe is allowed to cool. The lumps of clay, which are now coated with a thin, hard coating of deposited carbon of lead-like appearance, are arranged in an iron pipe so as to form a layer 5 centimetres in length, whereupon said pipe is heated and methane of 97 per cent purity is passed through with a speed of 30 litres per hour. At a temperature of the contact mass of 850° C. considerable quantities of ethylene are formed; with a lower speed and at about 880° C. (determined in the midst of the catalyst layer) products of higher molecular weight, in particular naphthalene and benzene are also formed; at a higher speed and a temperature above 900° C. chiefly acetylene is formed.

Example 2

Methane of 99 per cent purity is passed with a speed of 30 litres or more per hour at a high temperature through a quartz tube of 15 millimetres internal diameter, in which there is a layer 6 centimetres in length of quartz lumps ("Silex") of about 5 millimetres edge-length. After a laminary coating of deposited carbon of metallic lustre has been formed on the quartz lumps, up to 12 per cent of the methane is converted into acetylene and hydrogen at between 800° and 1200° C.

Similar results are obtained with other not too finely divided forms of silica or silicates, for example with lumps of rock crystal, feldspar, porcelain, silicate slags and mixtures of such materials.

Example 3

Ethane is passed with a speed of 40 litres per hour through a quartz tube 60 centimetres in length and 15 millimetres internal diameter, in which there is arranged a layer 10 centimetres in length of granulated aluminium nitride, which had previously been exposed for half an hour to a slow current (about 8 litres per hour) of acetylene at 750° C. and thereby coated with a lustrous deposit of carbon. With the said catalyst about 18 per cent of the ethane is converted into ethylene and hydrogen at about 800° C.

In a similar manner iron carbide, silicon nitride and other carbides and nitrides and also silicides and phosphides stable against heat are suitable for producing the lustrous deposit of carbon. In a manner similar to the conversion of ethane to ethylene, the said materials may be employed in the conversion of methane into acetylene.

What we claim is:

1. The process of producing valuable organic compounds which consists in bringing gases comprising saturated aliphatic hydrocarbons at a temperature of at least 700° C. but not exceeding 1000° C. into contact with lustrous, graphite-like carbon deposits produced on granular, fire-proof materials by the pyrogenic decomposition of carbon-containing compounds in the state of gas.

2. The process of producing valuable organic compounds which consists in bringing a saturated aliphatic hydrocarbon with from 1 to 2 carbon atoms at a temperature of at least 700° C. but not exceeding 1000° C. into contact with lustrous, graphite-like carbon deposits produced on granular, fire-proof materials by the pyrogenic decomposition of carbon-containing compounds in the state of gas.

3. The process of producing valuable organic compounds which consists in bringing gases comprising saturated aliphatic hydrocarbons at a temperature of at least 700° C. but not exceeding 1000° C. into contact with lustrous, graphite-like carbon deposits produced on granular, fire-proof materials by the pyrogenic decomposition of carbon-containing compounds in the state of gas, and passing the resulting gas over a catalyst having a condensing action at a temperature which is generally lower than that employed in the first catalytic treatment.

4. The process of producing valuable, chiefly aromatic, organic compounds which consists in bringing gases comprising saturated aliphatic hydrocarbons at a temperature of at least 700° C. but not exceeding 1000° C. into prolonged contact with lustrous, graphite-like carbon deposits produced on granular, fire-proof materials by the pyrogenic decomposition of carbon-containing compounds in the state of gas.

In testimony whereof we have hereunto set our hands.

ALWIN MITTASCH.
WALTER FRANKENBURGER.